(12) United States Patent
Jong (10) Patent No.: US 8,619,916 B2
(45) Date of Patent: Dec. 31, 2013

(54) APPARATUS FOR RECEIVING SIGNAL AND METHOD OF COMPENSATING PHASE MISMATCH THEREOF

(75) Inventor: Ilyong Jong, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 342 days.

(21) Appl. No.: 12/987,646

(22) Filed: Jan. 10, 2011

(65) Prior Publication Data

US 2011/0222631 A1    Sep. 15, 2011

(30) Foreign Application Priority Data

Mar. 11, 2010    (KR) .................. 10 2010 0021904

(51) Int. Cl.
*H03K 9/06* (2006.01)

(52) U.S. Cl.
USPC .............................................. 375/322

(58) Field of Classification Search
USPC .............................................. 375/322
See application file for complete search history.

(56) References Cited

U.S. PATENT DOCUMENTS

| | | | |
|---|---|---|---|
| 4,003,054 A * | 1/1977 | Goldstone | 342/174 |
| 6,950,480 B2 | 9/2005 | Brown | |
| 7,020,220 B2 | 3/2006 | Hansen | |
| 7,177,372 B2 * | 2/2007 | Gu | 375/316 |
| 7,187,916 B2 | 3/2007 | Mo et al. | |
| 7,570,923 B2 * | 8/2009 | Kiss et al. | 455/67.14 |
| 7,925,217 B2 * | 4/2011 | Park et al. | 455/67.11 |
| 2003/0231723 A1 | 12/2003 | Hansen | |
| 2004/0146120 A1 | 7/2004 | Brown | |
| 2004/0203472 A1 * | 10/2004 | Chien | 455/68 |
| 2004/0219884 A1 | 11/2004 | Mo et al. | |
| 2005/0107059 A1 * | 5/2005 | Lehning et al. | 455/303 |

FOREIGN PATENT DOCUMENTS

| | | |
|---|---|---|
| JP | 06-268703 A | 9/1994 |
| JP | 2003-087344 A | 3/2003 |
| KR | 2007-0049665 A | 5/2007 |

* cited by examiner

*Primary Examiner* — Juan A Torres
(74) *Attorney, Agent, or Firm* — Harness, Dickey & Pierce, P.L.C.

(57) ABSTRACT

An apparatus for receiving a signal includes a training signal generator generating a training signal for each frequency channel; an in-phase and quadrature-phase (IQ) signal generator generating a first in-phase signal and a first quadrature-phase signal using the training signal in a first operation mode and generating a second in-phase signal and a second quadrature-phase signal using a receiving signal in a second operation mode; an IQ mismatch compensator which makes the first in-phase signal and first quadrature-phase signal generated in response to each frequency channel converge for a reference time in the first operation mode to obtain a phase mismatch compensation coefficient for selected frequency channels and after generating a look-up table using the phase mismatch compensation coefficient, compensates the second in-phase signal and the second quadrature-phase signal using the phase mismatch compensation coefficient in the second operation mode; and a memory in which the look-up table is stored.

9 Claims, 7 Drawing Sheets

APPARATUS FOR RECEIVING SIGNAL AND METHOD OF COMPENSATING PHASE MISMATCH THEREOF

CROSS-REFERENCE TO RELATED APPLICATIONS

This U.S. non-provisional patent application claims priority under 35 U.S.C. §119 to Korean Patent Application No. 10-2010-0021904, filed on Mar. 11, 2010, in the Korean Intellectual Property Office (KIPO), the entire contents of which are hereby incorporated by reference.

BACKGROUND

1. Field

Example embodiments herein relates to an apparatus for receiving a signal, and more particularly, to an apparatus for receiving a signal preventing deterioration of receiving performance due to a mismatch between an in-phase I signal and a quadrature-phase Q signal and a method of compensating a phase mismatch thereof.

2. Related Art

Generally, an apparatus for receiving a signal in a communication system, that is, a receiver includes a low noise amplifier (LNA). The low noise amplifier (LNA) amplifies a signal of a received signal mixed with a noise on a wireless channel while suppressing the noise. The receiver processes an output signal of the low noise amplifier by wireless.

In the case that an output signal of the low noise amplifier (LNA) is processed by wireless, the receiver down-converts a received signal to generate an in-phase (hereinafter it is referred to as I) signal and a quadrature-phase (hereinafter it is referred to as Q). A phase difference of 90° exists between the I signal and the Q signal.

The receiver includes a local oscillator (LO) and a mixer to generate an I signal and a Q signal. The local oscillator (LO) generates a local oscillating signal and the local oscillating signal is outputted to a first mixer generating an I signal and to a second mixer generating a Q signal. Each of the first mixer and the second mixer mixes an output signal of the low noise amplifier and a local oscillating signal to generate an I signal and a Q signal respectively. The I and Q signals outputted from each of the first mixer and the second mixer pass through a band pass filter to be band pass-filtered. After that, the band pass-filtered signals pass through an analog to digital converter (ADC) to be converted into digital signals and received in the receiver.

The I signal and the Q signal outputted from each of the mixers should have a phase difference of 90°. In the case that the I signal and the Q signal do not have a phase difference of 90° due to performance of the mixers, a mismatch occurs between the I signal and the Q signal. A mismatch between the I signal and the Q signal distorts a base band signal received to deteriorate receiving performance of the receiver.

SUMMARY

Example embodiments provide an apparatus for receiving a signal. The apparatus for receiving a signal may include a memory, a training signal generator generating a training signal corresponding to each frequency channel; an IQ signal generator generating a first in-phase signal and a first quadrature-phase signal using the training signal in a first operation mode and generating a second in-phase signal and a second quadrature-phase signal using a received signal in a second operation mode; and an IQ mismatch compensator which makes the first in-phase signal and the first quadrature-phase signal generated in response to each frequency channel converge for a reference time in the first operation mode to obtain a phase mismatch compensation coefficient and after obtaining a phase mismatch compensation coefficient with respect to selected frequency channels and store the phase mismatch compensation coefficient in a look-up table in the memory, compensates the second in-phase signal and the second quadrature-phase signal using the phase mismatch compensation coefficient included in the look-up table in the second operation mode.

Example embodiments also provide a method of compensating a phase mismatch of an apparatus for receiving a signal. The method may include generating a training signal corresponding to each frequency channel in a first operation mode and converging a first in-phase signal and a first quadrature-phase signal generated using the training signal for a specific or reference time to obtain a phase mismatch compensation coefficient; obtaining a phase mismatch compensation coefficient from channels selected in the first operation mode and generating a look-up table using the obtained phase mismatch compensation coefficients; and compensating a phase mismatch of a second in-phase signal and a second quadrature-phase signal generated using a receiving signal in a second operation mode using the phase mismatch compensation coefficient extracted from the look-up table.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope, of the claims. The accompanying drawings are not to be considered as drawn to scale unless explicitly noted.

DETAILED DESCRIPTION OF THE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments herein relate to an apparatus for receiving a signal, and more particularly, to an apparatus for receiving a signal preventing deterioration of receiving performance due to a mismatch between an in-phase I signal and a quadrature-phase Q signal and a method of compensating a phase mismatch thereof.

An apparatus for receiving a signal, that is, a receiver has two operation modes. A first operation mode is a calibration mode which generates a phase mismatch compensation coefficient for phase mismatch compensation and a second operation mode is a normal mode which compensates a phase mismatch of I signal and Q signal of a received signal by applying a phase mismatch compensation coefficient to a received signal.

Figure 1:
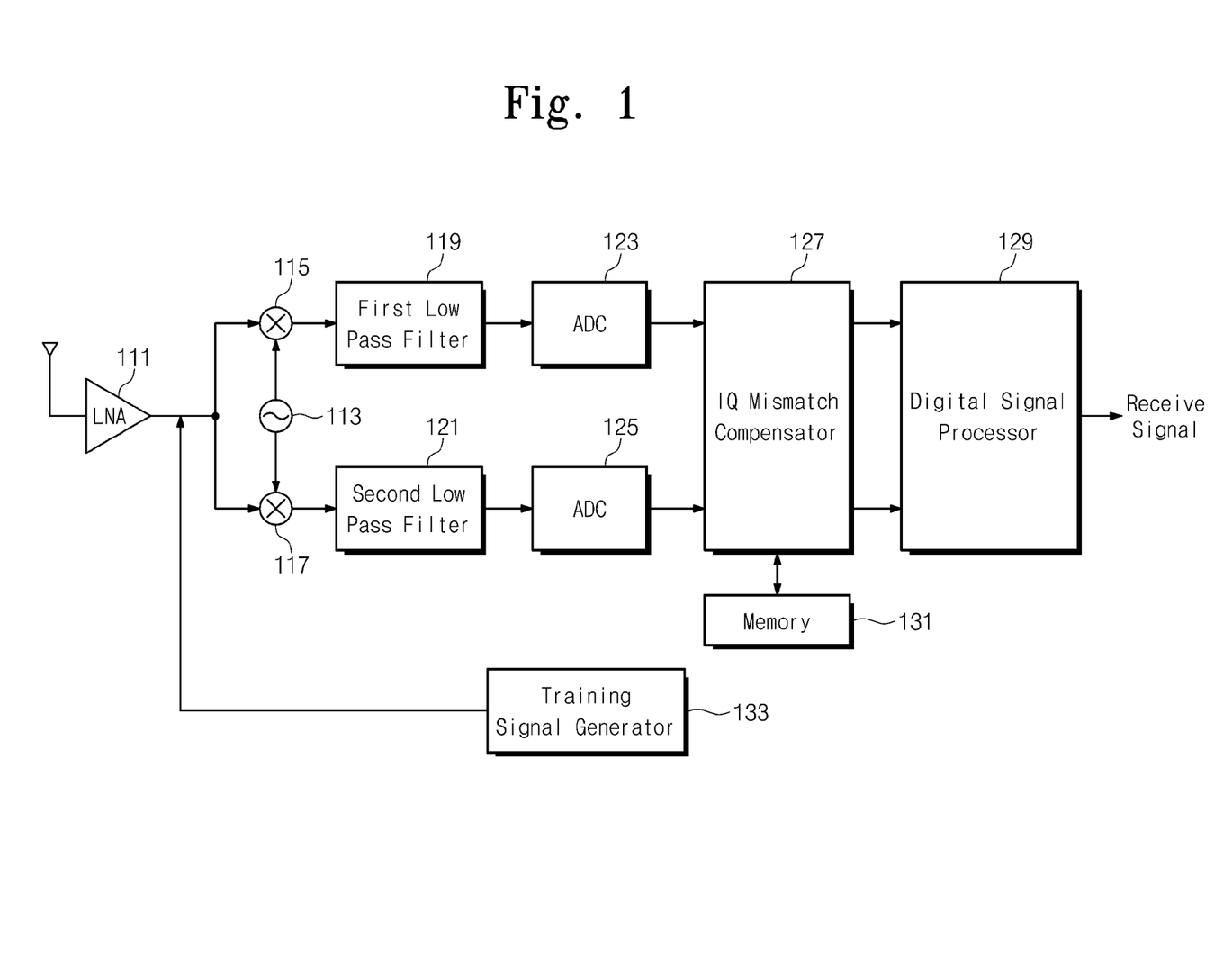
FIG. 1 is a drawing illustrating a structure of a receiver in accordance with an example embodiment.

FIG. 1 is a drawing illustrating a structure of a receiver in accordance with an example embodiment.

Referring to FIG. 1, a receiver includes a low noise amplifier (LNA) 111, a local oscillator (LO) 113, a first mixer 115, a second mixer 117, a first low pass filter 119, a second low pass filter 121, a first analog to digital converter (ADC) 123, a second analog to digital converter (ADC) 125, an in-phase-quadrature-phase mismatch compensator 127, a digital signal processor 129, a memory 131 and a training signal generator 133.

First, a case that a receiver operates by a first operation mode is described.

The training signal generator 133 divides the whole frequency band which a receiver can receive into the predetermined number of frequency channels. The training signal generator 133 generates a training signal having the same frequency as selected frequency channels among the whole frequency channel.

The local oscillator 113 generates local oscillating signals to generate an I signal and a Q signal.

The first mixer 115 receives a training signal and mixes the training signal with the local oscillating signal to generate an I signal.

The second mixer 117 receives a training signal and mixes the training signal with the local oscillating signal to generate a Q signal. The second mixer 117 generates a Q signal having a phase difference of 90° with respect to an I signal of the first mixer 115.

The first low pass filter 119 low pass-filters an I signal outputted from the first mixer 115. The second low pass filter 121 low pass-filters a Q signal outputted from the second mixer 117.

The first analog to digital converter 123 converts the low pass-filtered I signal into a digital signal and the second analog to digital converter 125 converts the low pass-filtered Q signal into a digital signal.

Here, the local oscillator 113, the first mixer 115 and the second mixer 117 may constitute an in-phase-quadrature-phase signal generator (hereinafter it is referred to as 'IQ signal generator') generating an IQ signal and the IQ signal generator may further include the first low pass filter 119, the second low pass filter 121, the first analog to digital converter 123 and the second analog to digital converter 125.

The IQ mismatch compensator 127 makes the generated I signal and Q signal converge for a or reference time using a training signal to obtain a phase mismatch compensation coefficient. The IQ mismatch compensator 127 obtains a phase mismatch compensation coefficient with respect to the one or more frequency channels selected to generate a training signal and if a phase mismatch compensation coefficient with respect to the whole frequency channel is obtained, the IQ mismatch compensator 127 generates a look-up table corresponding to each frequency channel to store on the memory 131.

The memory 131 stores the look-up table. The memory 131 can store a phase mismatch compensation coefficient used in the receiver before according to one of an initial operation and an awake operation of the receiver.

After the receiver completes a look-up table generation with respect to the whole frequency in the first operation mode, the receiver operates in the second operation mode. Next, a case that the receiver operates by the second operation mode is described.

The low noise amplifier (LNA) receives signals through an antenna and amplifies the received signals mixed with a noise on a wireless channel while suppressing the noise.

The local oscillator 113 generates local oscillating signals to generate an I signal and a Q signal.

The first mixer 115 receives a receiving signal and mixes the receiving signal with the local oscillating signal to generate an I signal.

The second mixer 117 receives a receiving signal and mixes the receiving signal with the local oscillating signal to generate a Q signal. The second mixer 117 generates a signal having a phase difference of 90° with respect to the first mixer 115.

The first low pass filter 119 low pass-filters an I signal outputted from the first mixer 115. The second low pass filter 121 low pass-filters a Q signal outputted from the second mixer 117.

The first analog to digital converter 123 converts the low pass-filtered I signal into a digital signal and the second analog to digital converter 125 converts the low pass-filtered Q signal into a digital signal.

Here, the local oscillator 113, the first mixer 115 and the second mixer 117 may constitute the IQ signal generator generating an IQ signal and the IQ signal generator may further include the first low pass filter 119, the second low pass filter 121, the first analog to digital converter 123 and the second analog to digital converter 125.

The IQ mismatch compensator 127 determines a frequency channel of the receiving signal and compensates the generated I and Q signals with a phase mismatch compensation coefficient using the receiving signal. The IQ mismatch compensator 127 extracts a phase mismatch compensation coefficient corresponding to a frequency channel from the look-up table stored in the memory 131 and can compensate a phase mismatch of I and Q signals using the extracted phase mismatch compensation coefficient.

The digital signal processor 129 digital signal-processes I and Q signals of which a phase mismatch is compensated to receive a signal.

Figure 2:
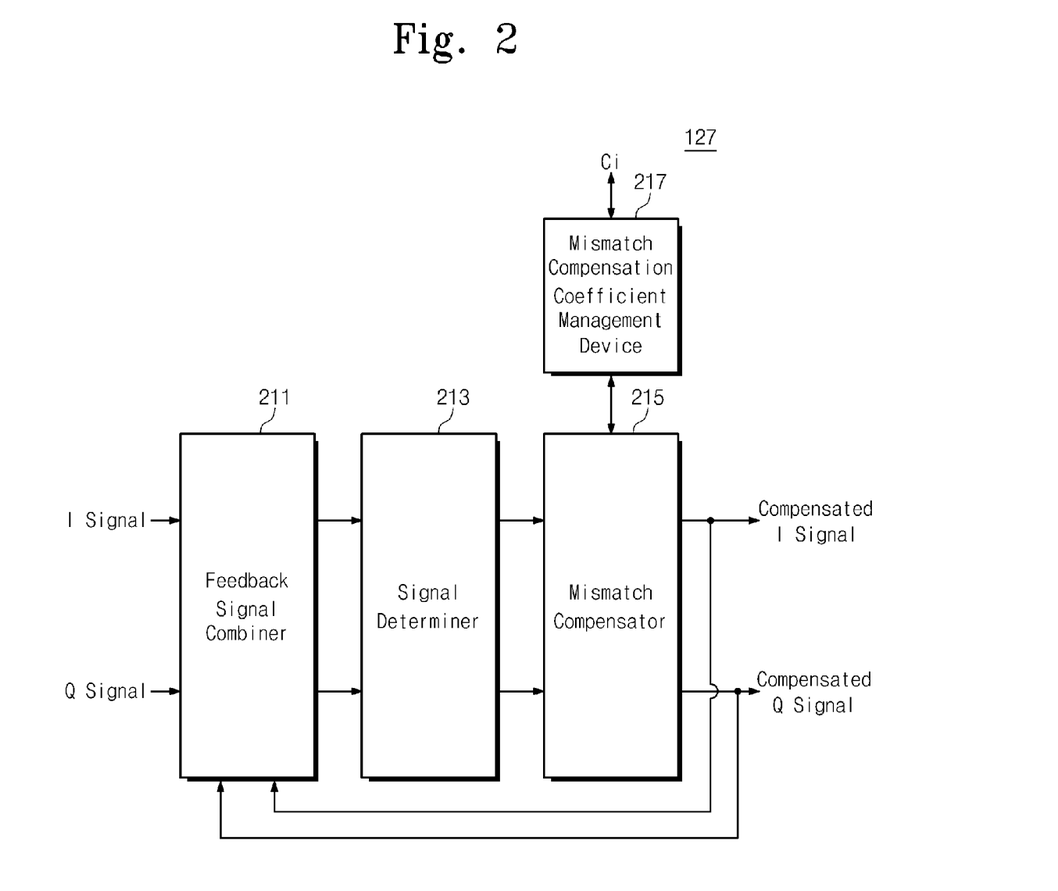
FIG. 2 is a drawing illustrating a structure of an IQ mismatch compensator of FIG. 1 by example.

FIG. 2 is a drawing illustrating a structure of an IQ mismatch compensator of FIG. 1 by example.

Referring to FIG. 2, the IQ mismatch compensator 127 includes a feedback signal combiner 211, a signal determiner 213, a mismatch compensator 215 and a mismatch compensation coefficient management device 217.

The feedback signal combiner 211 receives a feedback I signal and a feedback Q signal outputted before through the mismatch compensator 215. An I signal and a Q signal inputted into the feedback signal combiner 211 are combined with a feedback I signal and a feedback Q signal respectively to generate a combined I signal and a combined Q signal respectively.

The signal determiner 213 performs an absolute value operation on the combined I signal and the combined Q signal to generate an absolute value I signal and an absolute value Q signal. The signal determiner 213 generates an I signal determined by subtracting an absolute value quadrature-phase signal from an absolute I signal. The signal determiner 213 extracts a sign bit from the combined I signal and the combined Q signal respectively, determines a sign by performing an exclusive OR-operation on the extracted sign bits and sets a sign to a signal having a minimum value of the absolute value I signal and the absolute Q signal to generate a determined Q signal.

The feedback signal combiner 211 and the signal determiner 213 perform the same operation on an I signal and a Q signal respectively inputted from the first operation mode and the second operation mode.

The mismatch compensator 215 makes an I signal and a Q signal determined in the first operation mode converge for a or reference time to extract a phase mismatch compensation coefficient. The mismatch compensator 215 can generate a look-up table in which a phase mismatch compensation coefficient is mapped by a frequency channel using a phase mismatch compensation coefficient.

As an illustration, a look-up table is illustrated in a table 1 below.

TABLE 1

| Frequency channel index | Phase mismatch compensation coefficient |
|---|---|
|  | $C_0$ |
| 1 | $C_1$ |
| ... | ... |
| 0 | $C_{si-1}$ |
| $S_i$ | $C_{si}$ |
| ... | ... |
| M | $C_{si}$ |

The look-up table includes phase mismatch compensation coefficients Ci. Each frequency channel index means an index representing each frequency channel.

The mismatch compensation coefficient management device 217 selects a frequency channel corresponding to a receiving signal in the second operation mode and can provide a phase mismatch compensation coefficient corresponding to the selected frequency channel to the mismatch compensator 215.

The mismatch compensation coefficient management device 217 may select one frequency channel most adjacent to a frequency channel corresponding to a receiving signal to extract a phase mismatch compensation coefficient and may also interpolate phase mismatch compensation coefficients of at least two frequency channels adjacent to a frequency channel corresponding to a receiving signal to determine a phase mismatch compensation coefficient.

In the case that the mismatch compensation coefficient management device 217 selects one frequency channel corresponding to a receiving signal, Cn inputted in the mismatch compensator 215 may become Ci and in the case of using an interpolation to compensate a phase mismatch with respect to two adjacent channels, it may be represented by a mathematical formula I below.

$$C_n = \frac{C_{s_i} - C_{s_{i-1}}}{S_i - S_{i-1}} n + C_{s_i}$$ [mathematical formula 1]

In the mathematical formula I, as an example, an interpolation is performed on two adjacent channels to obtain Cn value. Here, n has values of 0~M−1.

The mismatch compensator 215 applies a phase mismatch compensation coefficient to a determined I signal and a determined Q signal to compensate a phase mismatch.

Figure 3:
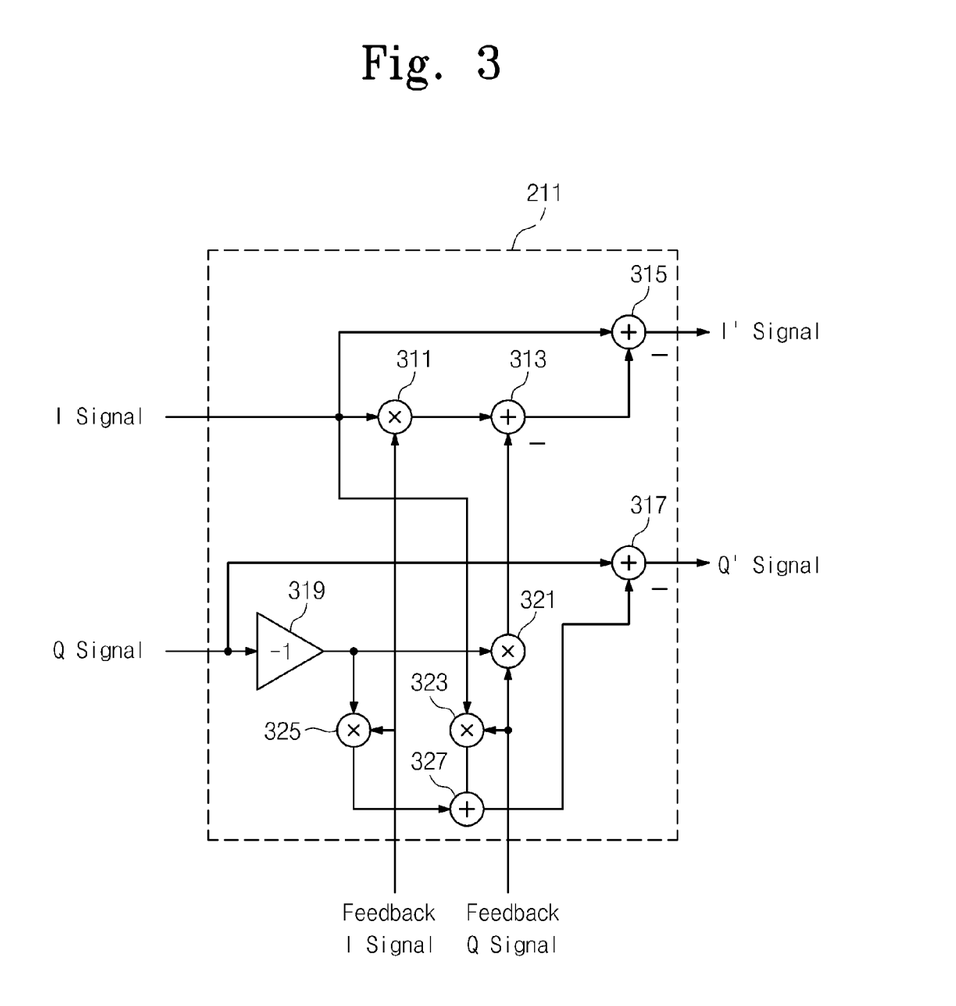
FIG. 3 is a drawing illustrating a feedback signal combiner of FIG. 2 by example.

FIG. 3 is a drawing illustrating a feedback signal combiner of FIG. 2 by example.

Referring to FIG. 3, the feedback signal combiner 211 includes a first multiplier 311, a first adder 313, a second adder 315, a fourth adder 317, an inverter 319, a second multiplier 321, a third multiplier 325, a fourth multiplier 323 and a third adder 327.

The first multiplier 311 multiplies an inputted I signal by a feedback I signal. The inverter 319 applies a minus sign to an inputted I signal.

The second multiplier 321 multiplies an output of the inverter 319 by a feedback Q signal.

The first adder 313 adds an output of the first multiplier 311 to an output of the second multiplier 321 to which a minus sign is applied. That is, the first adder 313 subtracts an output of the second multiplier 321 from an output of the first multiplier 311.

The second adder 315 adds an inputted I signal to an output of the first adder 313 to which a minus sign is applied. That is, the second adder 315 subtracts an output of the first adder 313 from an inputted I signal to generate a combined I signal (I' signal).

The third multiplier 325 multiplies an output of the inverter 319 by a feedback I signal.

The fourth multiplier 323 multiplies an inputted I signal by a feedback Q signal.

The third adder 327 adds an output of the third multiplier 325 and an output of the fourth multiplier 323.

The fourth adder 317 adds an inputted Q signal to an output of the third adder 327 to which a minus sign is applied. That is, the fourth adder 317 subtracts an output of the third adder 327 from an inputted Q signal to generate a combined Q signal (Q' signal).

Figure 4:
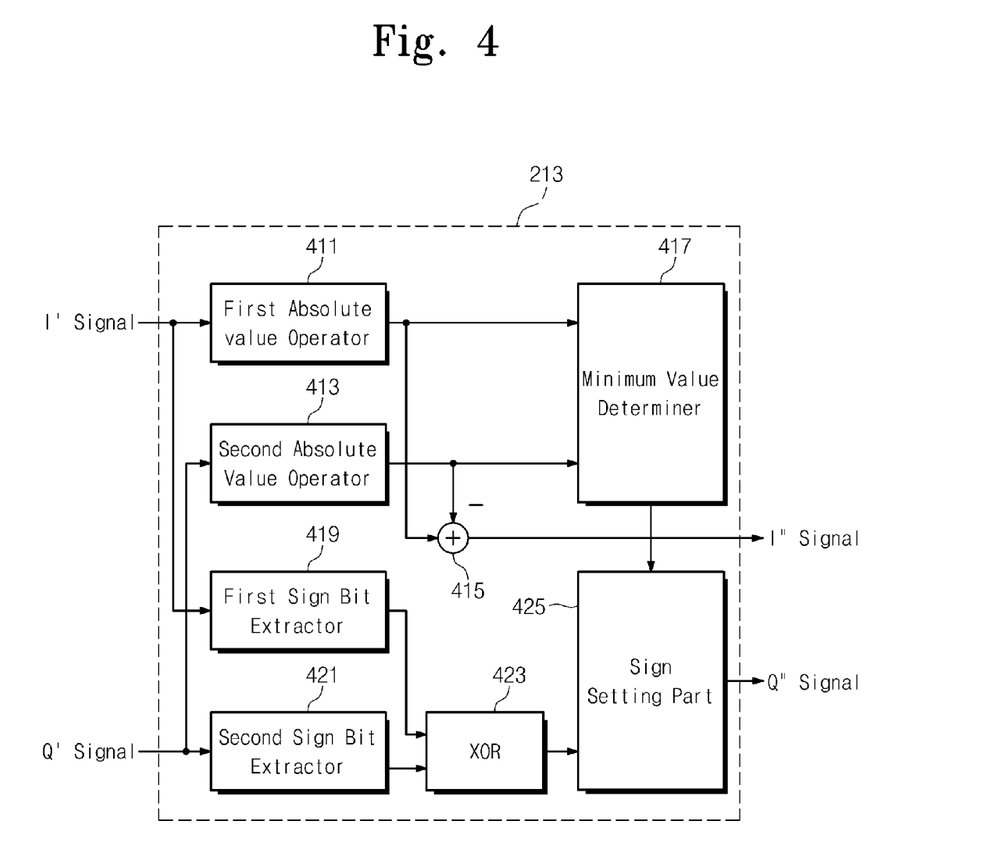
FIG. 4 is a drawing illustrating a structure of a signal determiner of FIG. 2 by example.

FIG. 4 is a drawing illustrating a structure of a signal determiner of FIG. 2 by example.

Referring to FIG. 4, the signal determiner 213 includes a first absolute value operator 411, a second absolute value operator 413, a fifth adder 415, a minimum value determiner 417, a first sign bit extractor 419, a second sign bit extractor 421, an exclusive OR operator 423 and a sign setting part 425.

The first absolute value operator 411 operates on a combined I signal to generate an absolute value I signal. The second absolute value operator 413 operates on a combined Q signal to generate an absolute value Q signal.

The fifth adder 415 adds an absolute value I signal to an absolute value Q signal to which a minus sign is applied. That is, the fifth adder 415 subtracts an absolute value Q signal from an absolute value I signal to generate a determined I signal (I'' signal).

The first sign bit extractor 419 extracts a sign bit from a combined I signal. The second sign bit extractor 421 extracts a sign bit from a combined Q signal.

The exclusive OR operator 423 performs an exclusive-OR operation on sign bits extracted from the first sign bit extractor 419 and the second sign bit extractor 421 to determine a sign.

The minimum value determiner 417 selects a minimum value of an absolute value I signal and an absolute value Q signal.

The sign setting part 425 sets a sign determined by the exclusive OR operator 423 to one signal of an absolute value I signal and an absolute value Q signal having a minimum value selected by the minimum value determiner 417 to generate a determined Q signal (Q'' signal).

Figure 5:
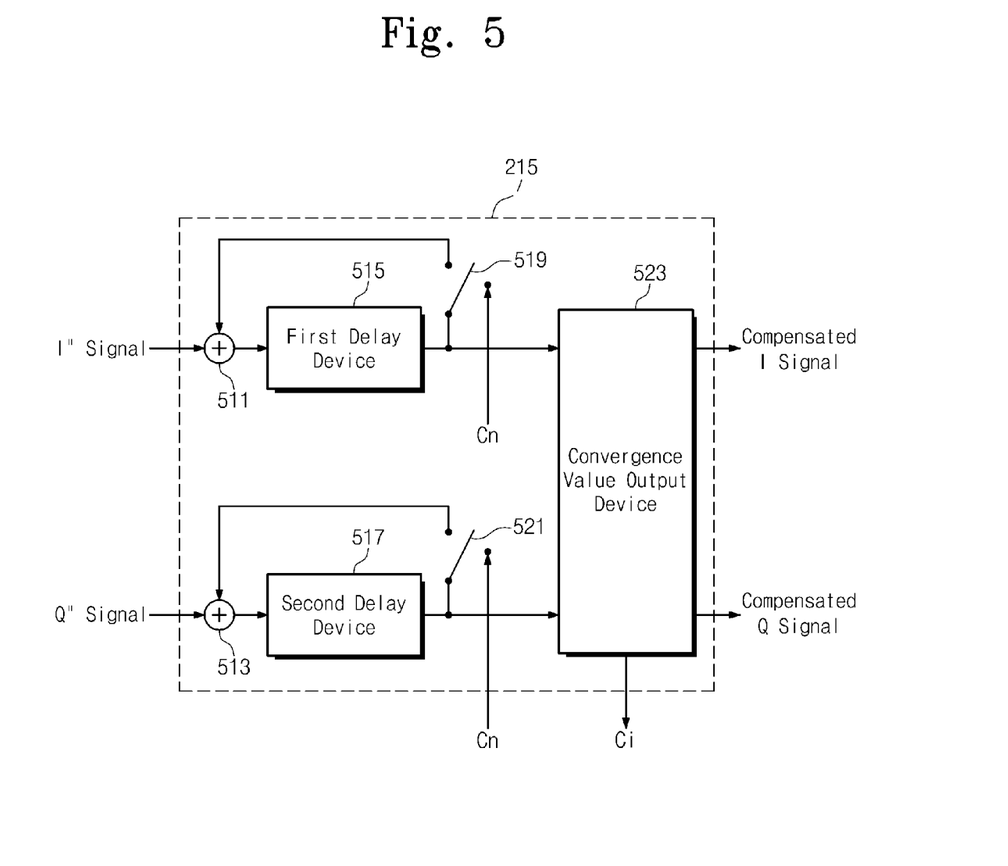
FIG. 5 is a drawing illustrating a structure of a mismatch compensator of FIG. 2 by example.

FIG. 5 is a drawing illustrating a structure of a mismatch compensator of FIG. 2 by example.

Referring to FIG. 5, the mismatch compensator 215 includes a sixth adder 511, a seventh adder 513, a first delay device 515, a second delay device 517, a first switch 519, a second switch 521 and a convergence value output device 523.

The first delay device 515 delays a determined I signal.

The sixth adder 511 is located at a front part of the first delay device 515 and adds a delay I signal switched from the first switch 519 to a determined I signal.

The first switch 519, in a first operation mode, switches an output of the first delay device 515 to an input of the sixth adder 511. The first switch 519, in a second operation mode, switches so that a phase mismatch compensation coefficient Cn is applied to an output of the first delay device 515.

The second delay device 517 delays a determined Q signal.

The seventh adder 513 is located at a front part of the second delay device 517 and adds a delay Q signal switched from the second switch 521 to a determined Q signal.

The second switch 521, in a first operation mode, switches an output of the second delay device 517 to an input of the seventh adder 513. The second switch 521, in a second operation mode, switches so that a phase mismatch compensation coefficient Cn is applied to an output of the second delay device 517.

The convergence value output device 523, in the first operation mode, controls the first and second switches 519 and 521 to feedback outputs of the delay devices 515 and 517 and converges for a or reference time to extract a phase mismatch compensation coefficient Ci. Also, the convergence value output device 523, in the second operation mode, controls the first and second switches 519 and 521 to compensate a phase mismatch by applying a phase mismatch compensation coefficient to a determined I signal and a determined Q signal.

The convergence value output device 523 outputs a phase mismatch compensation signal in the first operation mode and outputs signals in which a mismatch between the I signal and the Q signal is compensated, that is, a compensated I signal (I''' signal) and a compensated Q signal (Q''' signal) in the second operation mode.

Figure 6:
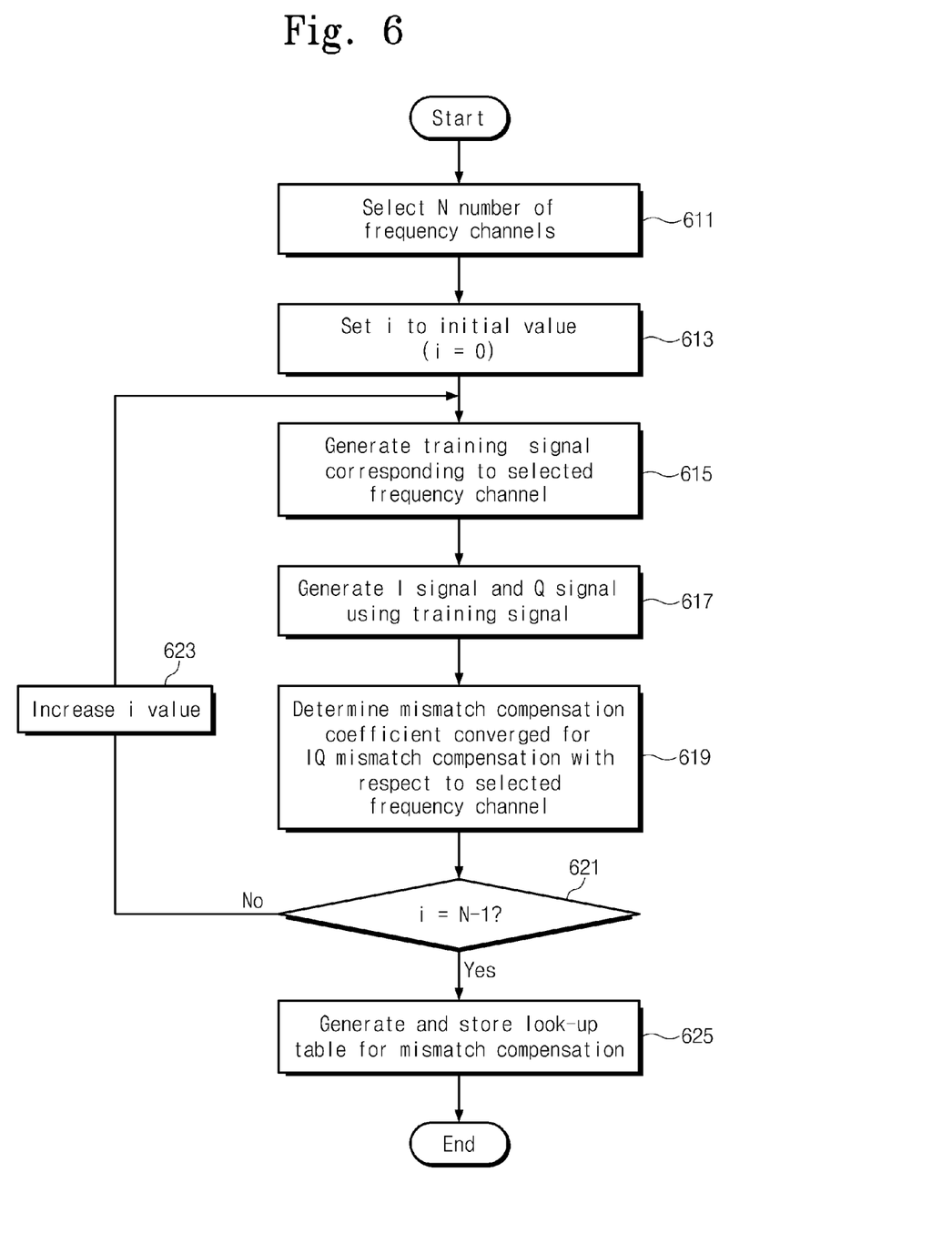
FIG. 6 is a flow chart illustrating an operation of a receiver in a first operation mode in accordance with an example embodiment.

FIG. 6 is a flow chart illustrating an operation of a receiver in a first operation mode in accordance with an example embodiment.

Referring to FIG. 6, in a step of 611, the receiver selects N number of frequency channels in the whole frequency band.

In a step of 613, the receiver sets i to an initial value.

In a step of 615, the receiver generates a training signal corresponding to the selected frequency channel.

In a step of 617, the receiver generates an I signal and a Q signal using the training signal.

In a step of 619, the receiver determines a mismatch compensation coefficient converged for an IQ mismatch compensation with respect to the selected frequency channel.

In a step of 621, the receiver checks whether i has the same value as N−1 or not. Here, N is the number of carrier frequencies.

After checking, in the case that i does not have the same value as N−1, a process goes to a step of 623.

In a step of 623, the receiver increases i by 1.

In the case that i has the same value as N−1, a process goes to a step of 625.

In a step of 625, the receiver generates and stores a look-up table for mismatch compensation, and then the flow came to an end. Phase mismatch compensation coefficients are mapped and stored in the look-up table by a frequency channel.

Figure 7:
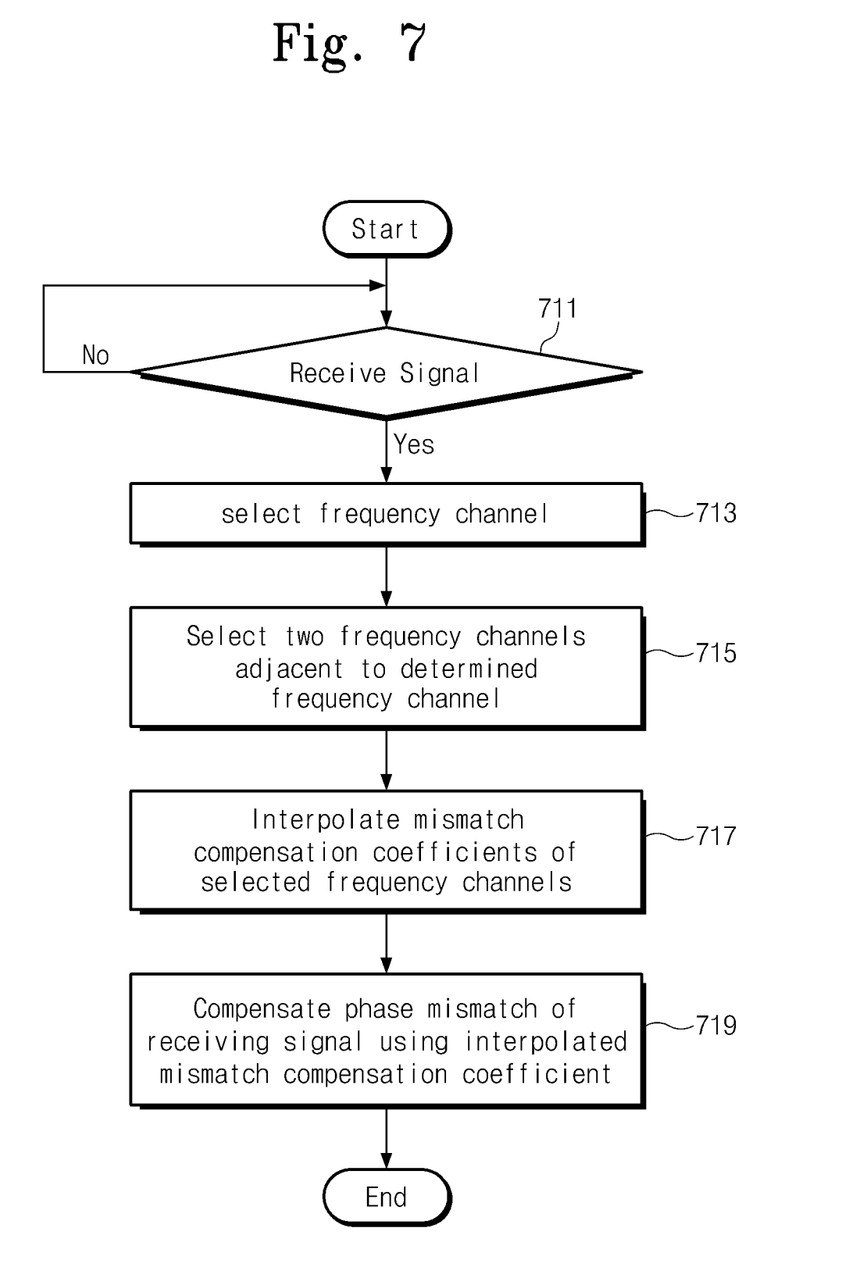
FIG. 7 is a flow chart illustrating an operation of a receiver in a second operation mode in accordance with an example embodiment.

FIG. 7 is a flow chart illustrating an operation of a receiver in a second operation mode in accordance with an example embodiment.

Referring to FIG. 7, in a step of 711, it is checked whether or not the receiver receives a signal.

In the case that the receiver does not receive a signal, a process goes to a step of 711.

In the case that the receiver receives a signal, a process goes to a step of 713.

In the step of 713, the receiver selects a frequency channel of a receiving signal.

In the step of 715, the receiver selects at least two frequency channels adjacent to a determined frequency channel.

In a step of 717, the receiver interpolates the values of selected frequency channels to obtain a phase mismatch compensation coefficient. The receiver can interpolate a phase mismatch compensation coefficient of each frequency channel using an equation of various degrees (for example, a linear equation, a quadratic equation, a cubic equation and so on). Here, the phase mismatch compensation coefficient can be detected from a look-up table set in the first operation mode.

The receiver may select one frequency channel most adjacent to a determined frequency channel to obtain a phase, mismatch compensation coefficient corresponding to the selected frequency channel without performing the steps of 715 and 717.

In a step of 719, the receiver compensates a phase mismatch of a receiving signal using an interpolated mismatch compensation coefficient.

According to example embodiments, an apparatus for receiving a signal generates a phase mismatch compensation coefficient for a phase mismatch compensation using a training signal. It is possible to compensate a phase difference between an in-phase signal and a quadrature-phase signal generated from a mixer by reflecting the phase mismatch compensation coefficient in a receiving signal to compensate a phase mismatch. Also, performance of an apparatus for receiving a signal can be improved by receiving a signal in which a phase difference between an in-phase signal and a quadrature-phase signal is compensated.

The above-disclosed subject matter is to be considered illustrative, and not restrictive, and the appended claims are intended to cover all such modifications, enhancements, and other embodiments, which fall within the true spirit and scope of example embodiments. Thus, to the maximum extent allowed by law, the scope of example embodiments is to be determined by the broadest permissible interpretation of the following claims and their equivalents, and shall not be restricted or limited by the foregoing detailed description.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An apparatus for receiving a signal, comprising:
    a memory;
    a training signal generator configured to generate a training signal corresponding to each of one or more frequency channels;
    an in-phase and quadrature-phase (IQ) signal generator configured to generate a first in-phase signal and a first quadrature-phase signal using the training signal in a first operation mode and generate a second in-phase signal and a second quadrature-phase signal using a received signal in a second operation mode; and
    an IQ mismatch compensator configured to cause the first in-phase signal and the first quadrature-phase signal generated in response to each of the one or more frequency channels to converge for a reference time in the first operation mode to obtain a phase mismatch compensation coefficient, configured to obtain the phase mismatch compensation coefficient with respect to selected frequency channels from among the one or more frequency channels and store the phase mismatch compensation coefficient in a look-up table in the memory, and configured to compensate the second in-phase signal and the second quadrature-phase signal using the phase mismatch compensation coefficient included in the look-up table in the second operation mode, after obtaining the phase mismatch compensation coefficient, wherein the IQ mismatch compensator includes,
    a feedback signal combiner configured to combine an inputted in-phase signal with a feedback in-phase signal and a feedback quadrature-phase signal outputted from an in-phase and quadrature-phase mismatch compensator to generate a combined in-phase signal, and configured to combine an inputted quadrature-phase signal with the feedback in-phase signal and the feedback quadrature-phase signal outputted from an in-phase and quadrature-phase mismatch compensator to generate a combined quadrature-phase signal,
    a signal determiner configured to generate a determined in-phase signal and a determined quadrature-phase signal by determining an absolute value of the combined in-phase signal and the combined quadrature-phase signal respectively, and
    a mismatch compensator configured to converge the determined in-phase signal and the determined quadrature-phase signal for a reference time in the first operation mode to extract the phase mismatch compensation coefficient, and configured to apply the phase mismatch compensation coefficient to the determined in-phase signal and the determined quadrature-phase signal in the second operation mode to compensate a phase mismatch.

2. The apparatus for receiving a signal of claim 1, wherein the feedback signal combiner comprises:
    a first multiplier configured to multiply an inputted in-phase signal by a feedback in-phase signal;
    an inverter configured to apply a minus sign to the inputted quadrature-phase signal;
    a second multiplier multiplying an output of the inverter by the feedback quadrature-phase signal;
    a first adder configured to subtract an output of the second multiplier from an output of the first multiplier;
    a second adder configured to generate a combined in-phase signal by subtracting an output of the first adder from the inputted in-phase signal;
    a third multiplier configured to multiply an output of the inverter by the feedback in-phase signal;
    a fourth multiplier configured to multiply the inputted in-phase signal by a feedback quadrature-phase signal;
    a third adder configured to add outputs of the third and fourth multipliers; and
    a fourth adder configured to generate a combined quadrature-phase signal by subtracting an output of the third adder from the inputted quadrature-phase signal.

3. The apparatus for receiving a signal of claim 1, wherein the signal determiner comprises:
    a first absolute value operator configured to determine an absolute value of the combined in-phase signal;
    a second absolute value operator configured to determine an absolute value of the combined quadrature-phase signal;
    a fifth adder configured to generate a determined in-phase signal by subtracting an output of the second absolute value operator from an output of the first absolute value operator;
    a first sign bit extractor configured to extract a sign bit from the combined in-phase signal;
    a second sign bit extractor configured to extract a sign bit from the combined quadrature-phase signal;
    an exclusive OR operator configured to perform an exclusive-OR operation on an output of the first sign bit extractor and an output of the second sign bit extractor;
    a minimum value determiner configured to determine a minimum value of the output of the first absolute value operator and the output of the second absolute value operator; and a sign setting part configured to generate a determined quadrature-phase signal by setting a sign to an output of the minimum value determiner by an output of the exclusive OR operator.

4. The apparatus for receiving a signal of claim 1, wherein the mismatch compensator comprises:
a first delay device configured to delay the determined in-phase signal for a reference time;
a sixth adder which is located at a front part of the first delay device configured to combine the determined in-phase signal with an output of the first delay device;
a first switch configured to switch the output of the first delay device to an input of the sixth adder in a first operation mode and to switch so that the phase mismatch compensation coefficient is applied to the output of the first delay device in a second operation mode;
a second delay device configured to delay the determined quadrature-phase signal for a reference time;
a seventh adder which is located at a front part the second delay device and configured to combine the determined quadrature-phase signal with an output of the second delay device;
a second switch configured to switch the output of the second delay device to an input of the seventh adder in a first operation mode and switch so that the phase mismatch compensation coefficient is applied to the output of the second delay device in a second operation mode; and
a compensation signal output device configured to extract a phase mismatch compensation coefficient converged for a reference time by controlling the first and second switches in a first operation mode and outputting an in-phase signal of which a phase mismatch is compensated and a quadrature-phase signal of which a phase mismatch is compensated by controlling the first and second switches in a second operation mode.

5. The apparatus for receiving a signal of claim 1, wherein the IQ mismatch compensator, in a second operation mode, is configured to determine a frequency channel of a receiving signal, interpolate phase mismatch compensation coefficients of at least two frequency channels adjacent to the determined frequency channel to determine a phase mismatch compensation coefficient of the determined frequency channel and output the determined phase mismatch compensation coefficient to a mismatch compensator.

6. The apparatus for receiving a signal of claim 1, wherein the memory is configured to store a phase mismatch compensation coefficient used in the receiver according to one of an initial operation and an awake operation of the receiver.

7. A method of compensating a phase mismatch, comprising:
generating a training signal corresponding to each of one or more frequency channels in a first operation mode and converging a first in-phase signal and a first quadrature-phase signal generated using the training signal for a reference time to obtain a phase mismatch compensation coefficient;
obtaining the phase mismatch compensation coefficient from channels selected in the first operation mode and generating a look-up table using the obtained phase mismatch compensation coefficients; and
compensating a phase mismatch of a second in-phase signal and a second quadrature-phase signal generated using a receiving signal in a second operation mode using the phase mismatch compensation coefficient extracted from the look-up table, wherein obtaining the phase mismatch compensation coefficient includes,
combining the first in-phase signal and the first quadrature-phase signal with a feedback signal;
generating a combined in-phase signal and a combined quadrature-phase signal by combining the combined first in-phase signal and the combined first quadrature-phase signal with a feedback in-phase signal and a feedback quadrature-phase signal;
generating an absolute in-phase signal and an absolute quadrature-phase signal by determining an absolute value of the combined in-phase signal and the combined quadrature-phase signal, respectively;
generating a determined in-phase signal by subtracting the absolute quadrature-phase signal from the absolute in-phase signal;
determining a sign by extracting a sign from each of the combined in-phase signal and the combined quadrature-phase signal to perform an exclusive-OR operation on the extracted sign;
determining a minimum value of the absolute value in-phase signal and the absolute value quadrature phase signal;
setting the sign to the minimum value to generate a determined quadrature-phase signal; and
combining the determined in-phase signal and the combined quadrature-phase signal with a delayed in-phase signal and a delayed quadrature-phase signal and determining a phase mismatch compensation coefficient by converging for a reference time.

8. The method of claim 7, wherein compensating the phase mismatch comprises detecting phase mismatch compensation coefficients of at least two frequency channels adjacent to a frequency channel of the receiving signal interpolated from the look-up table and interpolating the detected phase mismatch compensation coefficients to determine a phase mismatch compensation coefficient.

9. An apparatus for receiving a signal, comprising:
a memory;
a training signal generator configured to generate a training signal corresponding to each of one or more frequency channels;
an in-phase and quadrature phase (IQ) signal generator configured to operate in a first operation mode and a second operation mode such that in the first operation mode, the IQ signal generator is configured to generate a first in-phase signal and a first quadrature-phase signal based on the training signal, and in the second operation mode, the IQ signal generator is configured to generate a second in-phase signal and a second quadrature-phase signal based on a receiving signal; and
an IQ mismatch compensator configured to operate in the first operation mode and the second operation mode such that, in the first operation mode, the IQ mismatch compensator is configured to obtain a phase mismatch compensation coefficient based on selected frequency channels from among the one or more frequency channels by causing the first in-phase signal and the first quadrature-phase signal to converge for a reference time, and configured to store the obtained phase mismatch compensation coefficient in a look-up table in the memory, and in the second operation mode, the IQ mismatch compensator is configured to compensate the second in-phase signal and the second quadrature-phase signal using the phase mismatch compensation coefficient included in the look-up table,
wherein the IQ mismatch compensator includes, a feedback signal combiner configured to combine an inputted in-phase signal with a feedback in-phase signal and a feedback quadrature-phase signal outputted from an in-phase and quadrature-phase mismatch compensator to generate a combined in-phase signal, and configured to combine an inputted quadrature-phase signal with the feedback in-phase signal and the feedback quadrature-phase signal outputted from an in-phase and quadrature-phase mismatch compensator to generate a combined quadrature-phase signal, a signal determiner configured to generate a determined in-phase signal and a determined quadrature-phase signal by determining an absolute value of the combined in-phase signal and the combined quadrature-phase signal respectively, and a mismatch compensator configured to converge the determined in-phase signal and the determined quadrature-phase signal for a reference time in the first operation mode to extract the phase mismatch compensation coefficient, and configured to apply the phase mismatch compensation coefficient to the determined in-phase signal and the determined quadrature-phase signal in the second operation mode to compensate a phase mismatch.

\* \* \* \* \*